United States Patent [19]

Jalink, Jr. et al.

[11] Patent Number: 4,895,430
[45] Date of Patent: Jan. 23, 1990

[54] THERMAL COMPENSATING MOUNT

[75] Inventors: Antony Jalink, Jr., Newport News, Va.; Scott R. Campbell, Sanford, Fla.

[73] Assignee: The United States of America as represented by the Administrator of the National Aeronautics and Space Administration, Washington, D.C.

[21] Appl. No.: 366,205

[22] Filed: Jun. 12, 1989

Related U.S. Application Data

[63] Continuation of Ser. No. 168,065, Mar. 14, 1988, abandoned.

[51] Int. Cl.$^4$ .......................... G02B 7/18; G02B 27/64
[52] U.S. Cl. ...................................... 350/287; 350/500
[58] Field of Search ............... 350/287, 286, 500, 533, 350/588, 252, 631, 253, 254

[56] References Cited

U.S. PATENT DOCUMENTS

| | | | |
|---|---|---|---|
| 4,030,047 | 6/1977 | Fletcher et al. | 350/253 |
| 4,057,332 | 11/1977 | Brubaker | 350/253 |
| 4,147,413 | 4/1979 | Sims | 350/253 |
| 4,506,951 | 3/1985 | Yamada | 350/253 |
| 4,525,745 | 6/1985 | Ghoem-Maghumi et al. | 350/253 |
| 4,637,695 | 1/1987 | Perkins | 350/631 |

FOREIGN PATENT DOCUMENTS 015230 10/1981 German Democratic Rep. ................................. 350/253

Primary Examiner—Bruce Y. Arnold
Assistant Examiner—Ronald M. Kachmarik
Attorney, Agent, or Firm—Harold W. Adams; John R. Manning; Charles E. B. Glenn

[57] ABSTRACT

A thermal compensating mount 10 is provided for an alignment sensitive component 12. Thermal compensating 10 mount comprises a cylindrical extension 14 which is formed integral to and has the same coefficient of thermal expansion as alignment sensitive component 12. A cylindrical receptacle 20 is formed into mounting surface 18. Cylindrical extension 14 secured within cylindrical receptacle 20 that surrounds the cylindrical extension. The difference between the diameter of cylindrical extension 14 and cylindrical receptacle 20 is such that the differential thermal expansion across cylindrical extension 14 and the edges of cylindrical receptacle 20 is exactly compensated for by the thermal expansion of the surrounding adhesive 16.

4 Claims, 1 Drawing Sheet

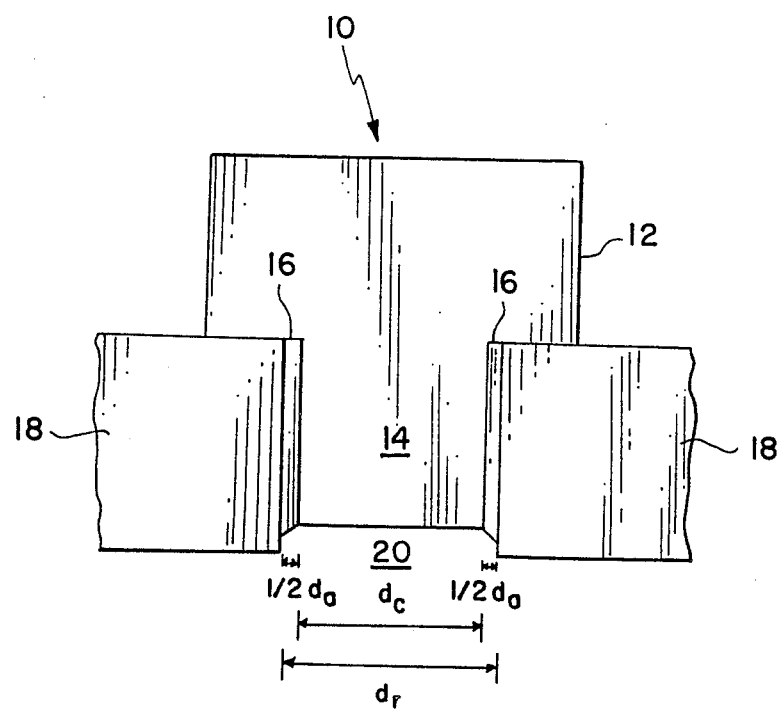

THERMAL COMPENSATING MOUNT

CROSS REFERENCE TO RELATED APPLICATIONS

This application is a continuation-in-part application of Ser. No. 07/168,065, Filed Mar. 14, 1988, now abandoned.

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435; 42 USC 2457).

TECHNICAL FIELD OF THE INVENTION

This invention relates generally to support structures for alignment sensitive components and more particularly to a thermal compensating mount for such components.

BACKGROUND OF THE INVENTION

Certain components such as optical components must maintain their alignmental integrity in order to be effective. A change in the ambient temperature can result in thermal expansion or contraction of the device and/or its mounting surface. Accordingly, lateral and/or angular displacements of the alignment sensitive component result. For example, optical components such as laser optical-path folding prisms are fixed to the mounting surface by a small amount of epoxy adhesive. When a change in temperature occurs, the unequal temperature coefficients of expansion of the prism, adhesive and mount cause undesirable angular and lateral displacements of the prism.

Accordingly, it is an object of this invention to provide a device for maintaining the alignmental integrity of an alignment sensitive component over a wide range of temperatures.

It is a further object of this invention to accomplish the above result simply and inexpensively.

SUMMARY OF THE INVENTION

According to the present invention, the foregoing and additional objects are obtained by providing a thermal compensating mount. A cylindrical extension is integrally formed to the alignment sensitive component. Both the extension and component share the same coefficient of thermal expansion. The cylindrical extension is placed into a cylindrical receptacle in a mounting structure which has a diameter greater than that of the extension. An adhesive secures the cylindrical extension to the mount. The difference between the diameters of the cylindrical extension and the cylindrical receptacle is such that the differential thermal expansion across the extension and the receptacle edges is exactly compensated for by the thermal compensation of the adhesive between them. Accordingly, the alignment sensitive component does not change position when subjected to temperature variations.

BRIEF DESCRIPTION OF THE DRAWINGS

Other objects and advantages of the present invention will become apparent in the specification and drawings wherein:

FIG. 1 is a pictoral view of the thermal compensating mount.

DETAILED DESCRIPTION OF THE INVENTION

As illustrated in FIG. 1, a thermal compensating mount 10 for an alignment sensitive component 12 is seen to comprise a cylindrical extension 14, an adhesive 16, a mounting surface 18, and a cylindrical receptacle 20.

Cylindrical extension 14 is integrally formed to alignment sensitive component 12 to aid in the alignment stability. Cylindrical extension 14 is composed of either the same material as alignment sensitive component 12 or a material with equivalent thermal expansion properties. The cylindrical shape of cylindrical extension 14 results in symmetrical expansion and flexibility in the azimuthal direction of alignment sensitive component 12.

The sizing of cylindrical extension 14 depends upon the size of the alignment sensitive component 12. The height of cylindrical extension 14 should be minimized. Accordingly, the diameter $d_c$ of cylindrical extension 14 is the design parameter which provides support for alignment sensitive component 12.

Cylindrical extension 14 is placed concentrically into a cylindrical receptacle 20 which is provided in mounting surface 18. Adhesive 16 surrounds and secures cylindrical extension 14 within the cylindrical receptacle 20. When a change in temperature occurs, misalignment of alignment sensitive component 10 will result unless the thermal expansion properties of cylindrical extension 14, mounting surface 18, and adhesive 16 are considered. To have no misalignment of alignment sensitive component 12, the thermal expansion of mounting surface 18 must be equal to the combined thermal expansion of cylindrical extension 14 and adhesive 16. Thus, stresses which cause misalignment may be avoided since the entire thermal compensating mount expands on contact at the same rate. The desired relationship may be expressed by $$A_r*2(t_{cm}) = A_c*2(t_{cc}) + A_a*2(t_{ca}) \qquad (1)$$

which may be simplified to read where
- $A_r$ is the area of cylindrical receptacle 20,
- $A_c$ is the area of cylindrical extension 14
- $A_a$ is the area of the gap between cylindrical receptacle 20 and cylindrical extension 14 which is filled by adhesive 16,
- $t_{cm}$ is the coefficient of thermal expansion for mounting surface 20,
- $t_{cc}$ is the coefficient of thermal expansion for cylindrical extension 14, and
- $t_{ca}$ is the coefficient of thermal expansion for adhesive 16. Obviously, $$A_a = A_r - A_c \qquad (2)$$

combining equations (1) and (2), $$A_r*t_{cm} = A_c + t_{cc} + (A_r - A_c)*t_{ca} \qquad (3)$$

Since $A_c$ is the design parameter for cylindrical extension 14 (see discussion above), it is helpful to express diameter $A_r$ of cylindrical receptacle 20 in terms of $A_c$. Dividing both side of equation (3) by $t_{cm}$, we obtain $$A_r = \frac{A_c * t_{cc} + (A_r - A_c) * t_{ca}}{t_{cm}} \quad (4)$$

Collect $A_r$ terms, we obtain $$A_r - A_r * \frac{t_{ca}}{t_{cm}} = A_c * \left[\frac{t_{cc} - t_{ca}}{t_{cm}}\right] \quad (5)$$

or $$A_r * \left[1 - \frac{t_{ca}}{t_{cm}}\right] = A_c * \left[\frac{t_{cc} - t_{ca}}{t_{cm}}\right] \quad (6)$$

Solving for $A_r$, we obtain $$A_r = \frac{A_c * \left[\frac{t_{cc} - t_{ca}}{t_{cm}}\right]}{\left[1 - \frac{t_{ca}}{t_{cm}}\right]} \quad (7)$$

or $$A_r = A_c * \left[\frac{t_{cc} - t_{ca}}{t_{cm} - t_{ca}}\right] \quad (8)$$

or $$d_r = d_c * \text{SQR}\left[\frac{t_{cc} - t_{ca}}{t_{cm} - t_{ca}}\right] \quad (9)$$

Thus, mounting surface 18 is provided with a cylindrical receptacle 20 with a diameter $d_r$.

In a particular embodiment of the present invention, alignment sensitive component 12 is a quartz prism for folding the optical path of laser. Cylindrical extension 14 has a diameter $d_c$ of 10 millimeters. The coefficient of thermal expansion of quartz in $0.4 \times 10E^{-6}$/deg. C. The mounting surface 18 is aluminum, which has a coefficient of thermal expansion of $24 \times 10E^{-6}$/deg. C. The adhesive 16 may be any commercially available adhesive with sufficient strength to support alignment sensitive component 12. For example, this adhesive may have a coefficient of thermal expansion of $90 \times 10E^{-6}$/deg. C. Substituting these values into equation (9), we obtain $$d_r = 10 \text{ mm} * \text{SQR}\left[\frac{0.4 \times 10E^{-6} - 90 \times 10E^{-6}}{24 \times 10E^{-6} - 90 \times 10E^{-6}}\right] \quad (10)$$

or, approximately $$d_r = 11.65 \text{ mm} \quad (11)$$

Thus cylindrical receptacle 20 requires a diameter of 11.65 mm. Such a sizing according to equation (9) maintains the alignment integrity of the quartz prism. A misalignment of only a few microradians of the quartz prism results in a significant drop in the gain of a laser. Thus, the present invention allows a laser to be utilized in environments characterized by changes in ambient temperature. For example, a laser on a vehicle which operates in an orbital path around the earth will undergo temperature changes of a few degrees Celsius as the vehicle travels from the dark to the light side of the earth. The present invention compensates for any expansion or contraction caused by these thermal changes.

What is claimed is:

1. A thermally compensating mount for an alignment sensitive component comprising:
    a cylindrical extension integrally formed to the alignment sensitive component and having the same coefficient of thermal expansion as the component;
    a mounting structure;
    a cylindrical receptacle in said mounting structure which has a diameter $d_r$ determined by the following equation:

$$d_r = d_c * \sqrt{\left(\frac{t_{cc} - t_{ca}}{t_{cm} - t_{cc}},\right)}$$

where $d_c$ is the diameter of said cylindrical extension and $t_{cc}$, $t_{ca}$ and $t_{cm}$ are the respective coefficients of thermal expansion for said cylindrical extension, a means for adhering, and said mounting structure; and
    a means for placing said means for adhering between said cylindrical extension and said cylindrical receptacle.

2. The mount of claim 1 wherein said alignment sensitive component is quartz.

3. The mount of claim 2 wherein said cylindrical extension is quartz.

4. The mount of claim 1 wherein said mounting structure is aluminum.

* * * * *